United States Patent [19]

Hirai et al.

[11] Patent Number: 5,783,051

[45] Date of Patent: Jul. 21, 1998

[54] APPARATUS FOR PRODUCING HYDROGEN AND OXYGEN

[75] Inventors: Kiyoshi Hirai, Kakogawa; Shinichi Yasui, Kako-gun; Hiroko Kobayashi, Kobe; Mamoru Nagao, Osaka; Takashi Sasaki, Miki; Akira Asari, Kobe; Hiroyuki Harada, Tokyo, all of Japan

[73] Assignee: Shinko Pantec Co., Ltd., Hyogo, Japan

[21] Appl. No.: 811,348

[22] Filed: Mar. 4, 1997

[51] Int. Cl.⁶ ............................................. C25B 9/00
[52] U.S. Cl. ..................... 204/254; 204/255; 204/257
[58] Field of Search ............................ 204/254, 256, 257, 258, 255; 429/38, 39; 205/628

[56] References Cited

U.S. PATENT DOCUMENTS

| | | | |
|---|---|---|---|
| 4,077,863 | 3/1978 | Nasser | 204/256 |
| 4,273,629 | 6/1981 | Korach | 204/254 |
| 4,323,443 | 4/1982 | Pere | 204/279 |
| 4,720,331 | 1/1988 | Billings | 204/258 |
| 4,789,443 | 12/1988 | de Nora et al. | 204/254 |
| 4,975,171 | 12/1990 | Nishiki et al. | 204/254 |
| 5,015,354 | 5/1991 | Nishiki et al. | 204/254 |
| 5,112,463 | 5/1992 | Zhang et al. | 204/256 |
| 5,401,371 | 3/1995 | Oshima et al. | 204/258 |
| 5,571,390 | 11/1996 | Kimura et al. | 204/254 |

FOREIGN PATENT DOCUMENTS 63-502908  10/1988  Japan.
06003328 A  1/1994  Japan.

OTHER PUBLICATIONS

Hanizumi, *Electric Chemical Manual*, issued by The Electric Chemical Society of Japan, pp. 732–735 (1981); translation of p. 733, lines 8–21. no month available.

*Primary Examiner*—Bruce F. Bell
*Attorney, Agent, or Firm*—Marshall, O'Toole, Gerstein, Murray & Borun

[57] ABSTRACT

An apparatus for producing hydrogen and oxygen having a pressure vessel surrounding a bipolar-type water electrolytic cell. The electrolytic cell contains a plurality of joined solid electrolyte membrane units, and each solid electrolyte membrane unit contains a solid electrolyte membrane, porous conductors in contact with opposing surfaces of the solid electrolyte membrane, and bipolar-type electrode plates in contact with each porous conductor, wherein each electrode plate is capable of performing as an anode and a cathode. A gap is present between the interior of the pressure vessel and the exterior of the water electrolytic cell to form a water pressure regulating chamber, and water of a preselected pressure can be fed into the water pressure regulating chamber such that the pressure differential between the pressure inside the water electrolytic cell and the pressure inside the water pressure regulating chamber is maintained within the pressure differential tolerance range of the water electrolytic cell.

6 Claims, 9 Drawing Sheets

APPARATUS FOR PRODUCING HYDROGEN AND OXYGEN

BACKGROUND OF THE INVENTION

1. Field Of The Invention

The present invention relates to a bipolartype apparatus for producing hydrogen and oxygen wherein solid electrolyte membranes are used as diaphragms, such that when deionized water is fed to the anode side of bipolar-type electrode plates, electrolysis is effected to generate oxygen gas from the anode side of the membrane and hydrogen gas from the cathode side of the membrane.

2. Description Of The Related Art

With respect to the construction of an apparatus for producing hydrogen and oxygen, a socalled bipolar-type filter press-type electrolyzer, as disclosed in Shinpan Denki-Kagaku Binran (Electrochemical Manual, the Latest Version), compiled by Denki-kagaku Kyokai, published by Maruzen, 2nd version, 4th print, page 733, and as illustrated in FIG. 8 herein, has been proposed for large-scale facilities that require large volumes of oxygen gas and hydrogen gas.

This apparatus comprises a water electrolytic cell having a plurality of joined solid electrolyte membrane units 220, wherein each solid electrolyte membrane unit 220 comprises a solid electrolyte membrane 210, for example, a cation exchange membrane (e.g., a cation exchange membrane made of a fluorocarbon resin containing sulphonic acid groups, for example, NAFION 117, available from E. I. DuPont deNemours, Wilmington, Del.), meshy porous conductors 211 and 212, constructed of, for example, a metal of the platinum group, and being positioned on both sides of electrolytic membrane 210, and bipolar-type electrode plates 213 being positioned outside both porous conductors 211 and 212. A bipolar-type electrode plate 213 is a single electrode plate having opposing faces that have an opposite polarity when energized.

In this case, when water is fed to the anode side of the plate, electrolysis is effected. As a result, on the anode side, a reaction $2H_2O \rightarrow O_2 + 4H^+ + 4e^-$ occurs to generate oxygen gas. On the cathode side, a reaction $4H^+ + 4e^- \rightarrow 2H_2$ occurs to generate hydrogen gas.

The prior art apparatus has such a construction that deionized water feeding paths 215 are provided to feed deionized water to porous conductors 211 on the anode side of solid electrolyte membrane units 220, and oxygen gas discharging paths 216 are provided to discharge oxygen gas (including water) from porous conductors 211 on the anode side of solid electrolyte membrane units 220, and further hydrogen discharging paths 217 are provided to discharge hydrogen gas (including water) from porous conductors 212 on the cathode side of solid electrolyte membrane units 220.

To be more specific, with respect to the construction of water feeding paths, and other elements of a prior art apparatus for producing hydrogen and oxygen, a manifold-type water feeding path is provided longitudinally to the water electrolytic cell to feed water to the anode side thereof, and another manifold-type discharging path is provided longitudinally to discharge generated oxygen and water from the anode side, and another manifold-type discharging path is provided longitudinally to discharge generated hydrogen and water from the cathode side. In this case, annular gaskets (not illustrated) are provided on the circumference of a porous conductor of the water electrolytic cell, with a solid electrolyte membrane being held between annular gaskets, so that the interior of the water electrolytic cell is sealed from the atmosphere.

In a conventional prior art apparatus for producing hydrogen and oxygen described above, if the pressure in the water electrolytic cell is significantly higher than pressure on the atmospheric side, the sealing elements can be damaged, such that oxygen, hydrogen, and/or water can be released to the atmosphere through the gaskets. This is not desirable. There is another problem at the startup of the apparatus, i.e., if the difference in pressure between the anode side and the cathode side of an electrolytic membrane unit is excessive, the solid electrolyte membranes can be damaged, and thereby prevent the apparatus from functioning properly.

In consideration of these problems, the present invention provides an apparatus for producing hydrogen and oxygen that can be operated at high pressures, wherein the sealing elements remain intact, and oxygen, hydrogen, and water are not released through the gaskets to the atmosphere, even when the pressure inside the water electrolytic cell is significantly higher than atmospheric pressure, for example, 10 $kg/cm^2$.

The present invention also provides an apparatus for producing hydrogen and oxygen that can be operated at high pressures, wherein at the startup of the apparatus the pressure differential between the anode side and the cathode side of an electrolytic membrane unit is maintained sufficiently low to preclude damaging the solid electrolyte membranes, and the apparatus is able to perform its intended functions smoothly.

SUMMARY OF THE INVENTION

The present invention solves the problems of the prior art apparatus and accomplishes the objectives mentioned above, as summarized in the following paragraphs (1) through (6).

(1) An apparatus for producing hydrogen and oxygen being characterized in that a bipolar-type water electrolytic cell is positioned in a pressure vessel. The bipolar-type water electrolytic cell has a plurality of solid electrolyte membrane units joined together, wherein each solid electrolyte membrane unit comprises a solid electrolyte membrane, a first and a second porous conductor positioned on opposing surfaces of the solid electrolyte membrane, respectively, and a bipolar-type electrode plate positioned on each of the first and the second porous conductors, said electrode plate capable of performing the function of an anode and a cathode.

A gap is provided between the interior of the pressure vessel and the exterior of the water electrolytic cell to form a water pressure regulating chamber, wherein pure water or deionized water of a desired, or preselected, pressure can be fed into the water pressure regulating chamber so that the pressure differential between the pressure inside the water electrolytic cell and the pressure inside the water pressure regulating chamber is maintained within the pressure tolerance range of the sealing elements of the water electrolytic cell.

(2) An apparatus for producing hydrogen and oxygen described in (1) above wherein the water electrolytic cells are provided with at least one manifold-type water feeding path, and at least one manifold-type water-draining path, linked longitudinally to the respective solid electrolyte membrane units so that when the apparatus for producing hydrogen and oxygen is started, the pressure on each side of the solid electrolyte membrane inside the water electrolytic cell is maintained substantially identical by a feed of uniformly pressurized water.

(3) An apparatus for producing hydrogen and oxygen described in (1) above wherein after startup and during the normal operation of the apparatus for producing hydrogen and oxygen, pressure regulators provided for an oxygen gas-liquid separator and a hydrogen gas-liquid separator are controlled such that the difference in pressure between the oxygen gas pressure on the anode chamber and the hydrogen gas pressure on the cathode chamber in the water electrolytic cell does not exceed the maximum design tolerance for a pressure differential between the oxygen side and the hydrogen side of the solid electrolyte membranes.

(4) An apparatus for producing hydrogen and oxygen described in any of (1) through (3) above wherein a manifold-type hydrogen gas discharging path for discharging hydrogen gas from the cathode chamber and a manifold-type oxygen gas discharging path for discharging oxygen gas from the anode chamber are positioned to link longitudinally to the respective solid electrolyte membrane units.

(5) An apparatus for producing hydrogen and oxygen described in any of (1) through (4) above wherein one or more insulating spacers are positioned in the gap between the interior of the pressure vessel and the exterior of the electrolytic cell to prevent contact between the vessel and the cell.

(6) An apparatus for producing hydrogen and oxygen described in any of (1) through (5) above wherein the solid electrolyte membrane is a solid polymer electrolyte membrane.

The apparatus for producing hydrogen and oxygen according to the present invention have the following novel and unexpected features.

(1) A gap is provided between the interior of a pressure vessel in which a water electrolytic cell is stored and the exterior of the water electrolytic cell to form a water pressure regulating chamber, and deionized water of a desired pressure is arranged to be fed into the water pressure regulating chamber. During startup of the apparatus, deionized water from the water pressure regulating chamber is introduced into the water feeding path on the oxygen side of the electrolytic cell, and deionized water having the same pressure as the above-mentioned preselected pressure is supplied to the hydrogen side of the electrolytic cell. As a result, the pressure inside the water electrolytic cell and the pressure outside the water electrolytic cell is substantially equalized. Thus, the difference in pressure between the inside and the outside thereof can be maintained within the pressure tolerance range of the sealing elements of the water electrolytic cell. Hence, the sealing elements are not damaged, and oxygen gas, hydrogen gas, and water do not leak from the water electrolytic cell.

(2) During startup of the apparatus, both sides of the solid electrolyte membrane can be under equivalent pressures. Thus, the pressure differential between the oxygen side and the hydrogen side of the solid electrolyte membrane can be maintained within the pressure tolerance range of the solid electrolyte membrane. Hence, the solid electrolyte membrane is not broken or damaged.

(3) During operation (electrolysis) of the apparatus, the pressure differential between the water pressure regulating chamber and the water electrolytic cell can be maintained within the pressure tolerance range of the sealing elements of the water electrolytic cell. Hence, the sealing elements are not damaged, and oxygen gas, hydrogen gas, and water cannot leak from the water electrolytic cell.

(4) Moreover, the pressure differential between the oxygen side and the hydrogen side of the solid electrolyte membrane can be controlled within design standards, and the solid electrolyte membrane is tot damaged.

(5) Accordingly, the present invention provides an apparatus for producing hydrogen and oxygen that can be operated at higher pressures relative to present conventional prior art apparatus.

DESCRIPTION OF THE PREFERRED EMBODIMENTS

In the following, embodiments of the present invention are described in detail with reference to the attached drawings.

Figure 1:
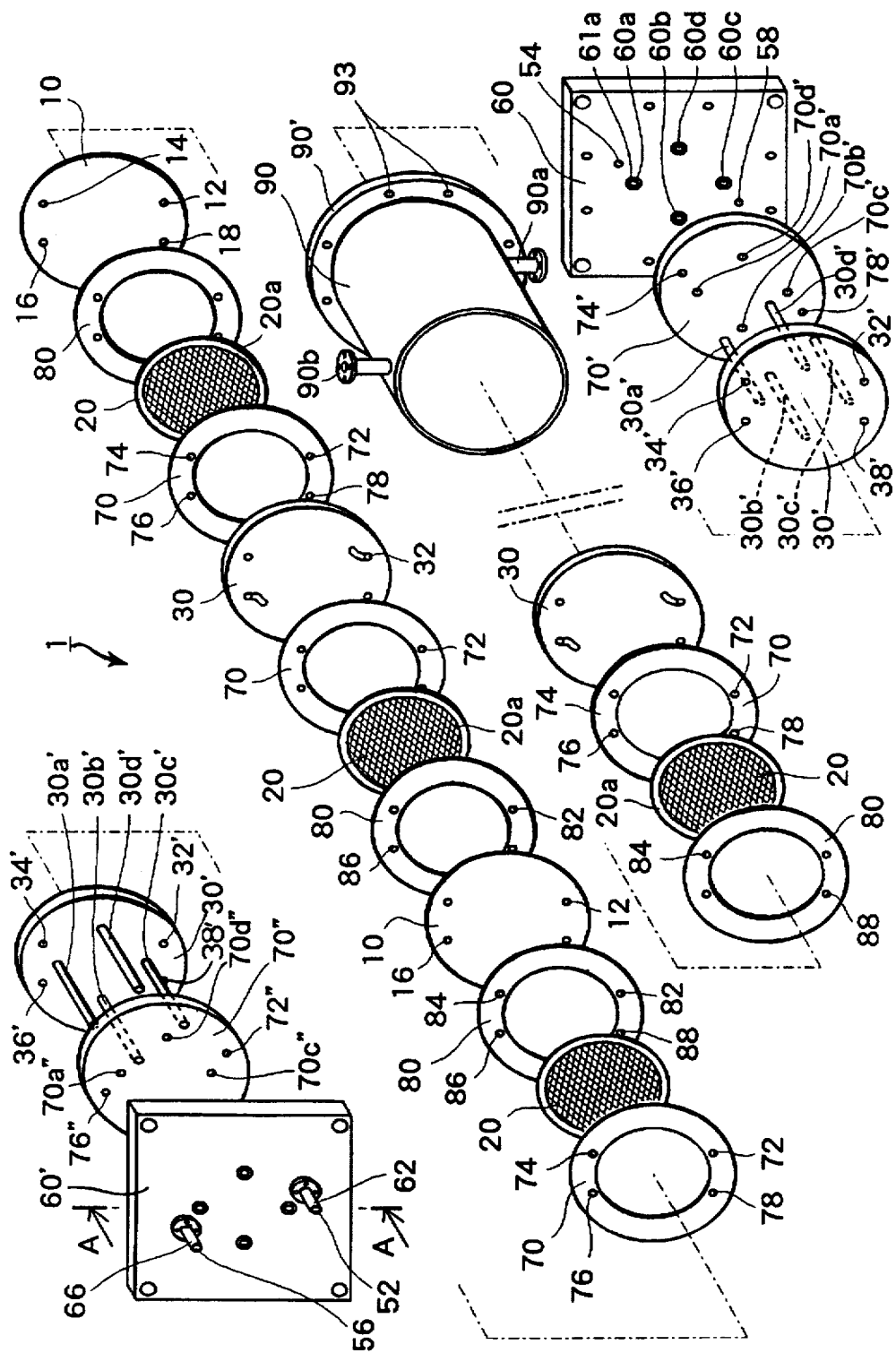
FIG. 1 is an exploded perspective view of an embodiment of an apparatus for producing hydrogen and oxygen according to the present invention.
Figure 2:
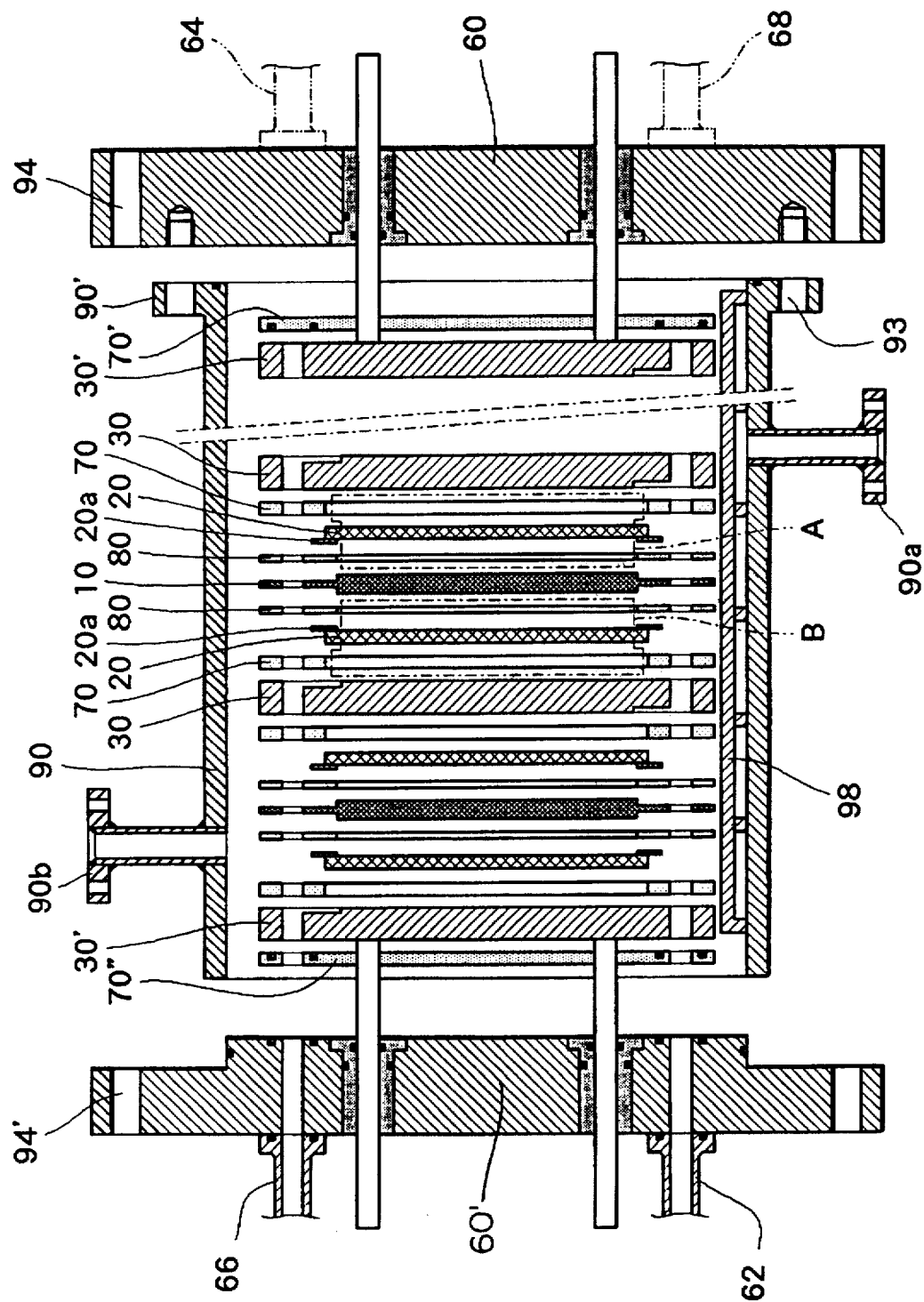
FIG. 2 is a partial longitudinal sectional view along the line A—A of FIG. 1 and shows the respective components separated slightly from each other for better understanding.
Figure 3:
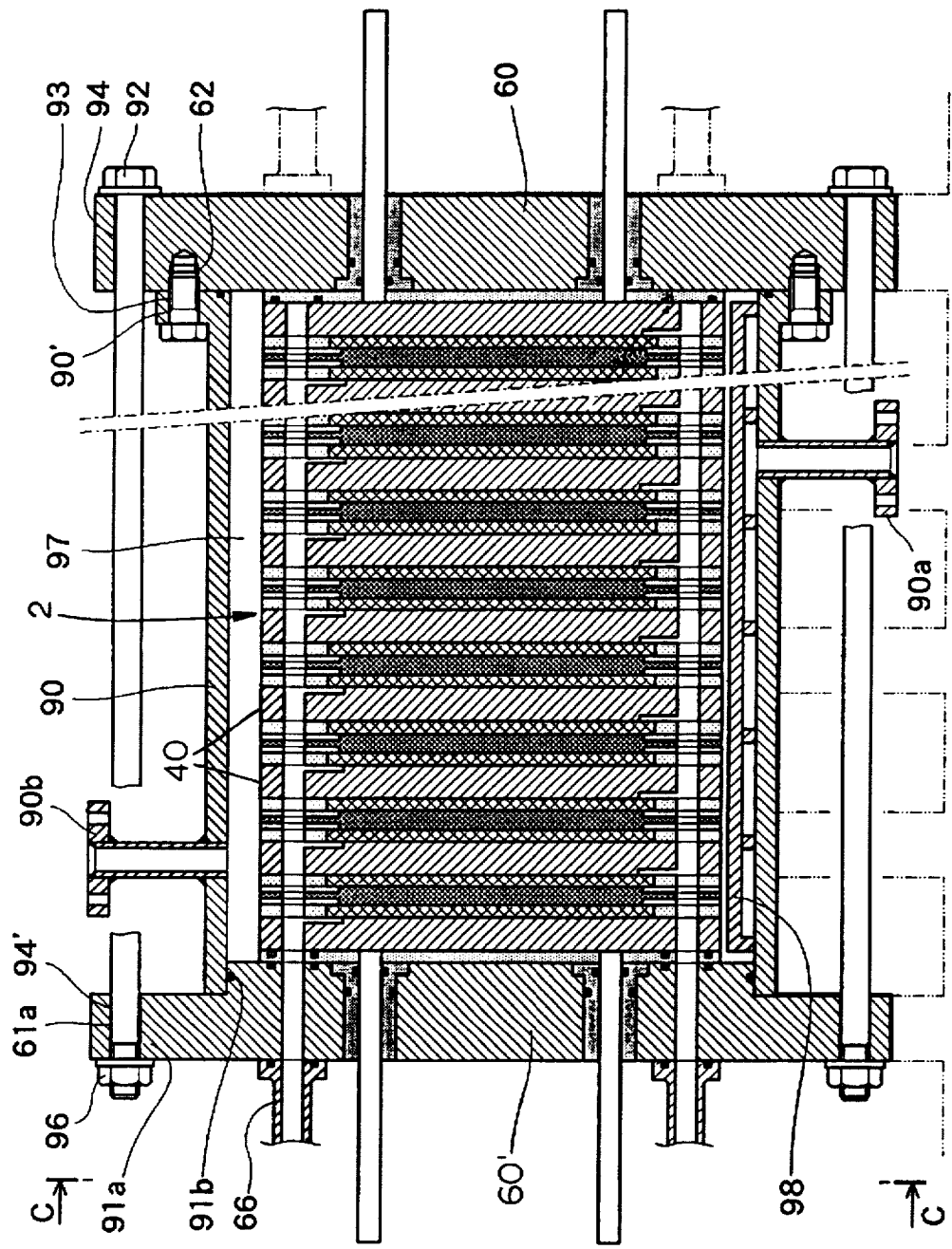
FIG. 3 is a partial longitudinal sectional view showing the apparatus of FIG. 2 in an assembled condition.
Figure 4:
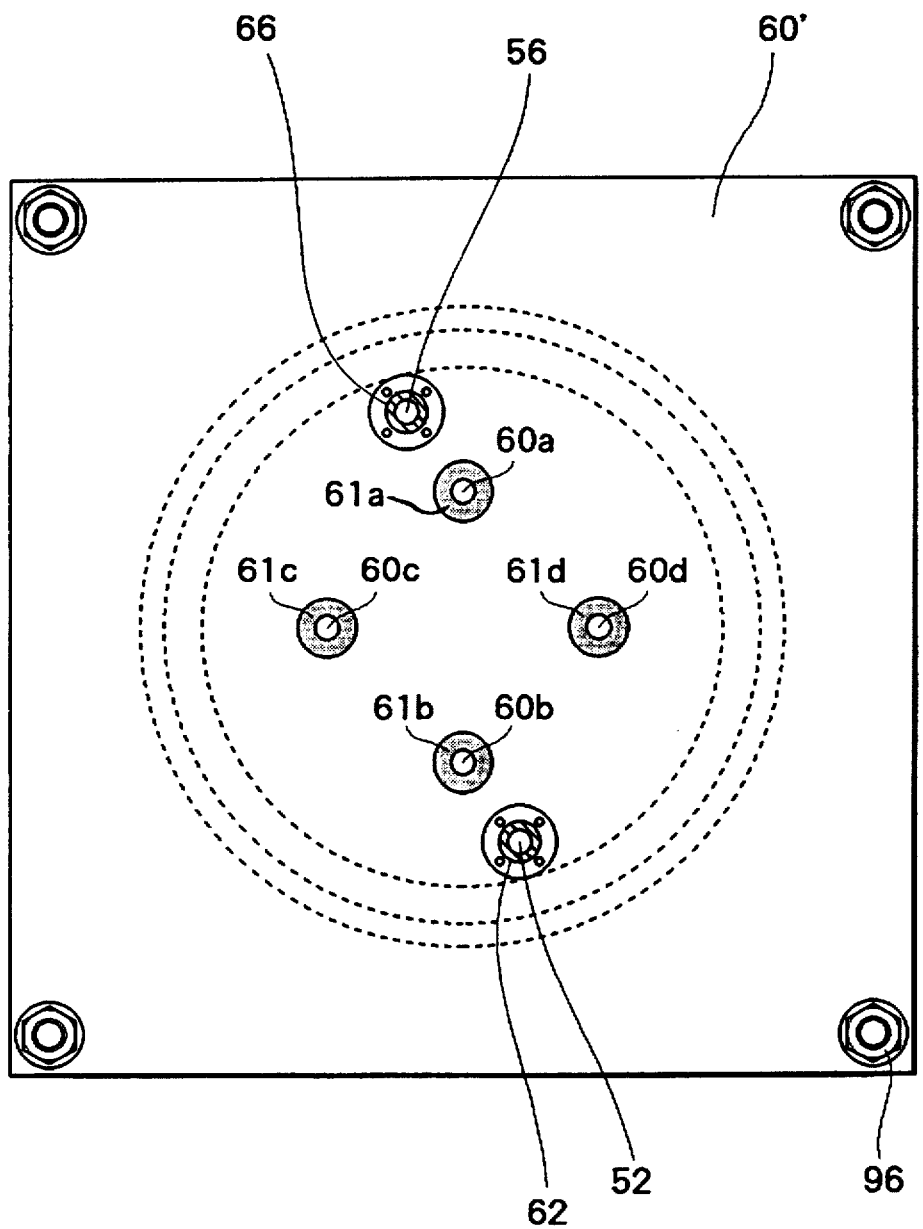
FIG. 4 is the end view in the direction C of FIG. 3.

FIG. 1 is an exploded perspective view of an embodiment of an apparatus for producing hydrogen and oxygen according to the present invention. FIG. 2 is a partial longitudinal sectional view along the line A—A of FIG. 1 and shows the respective components separated slightly from one other for better understanding of the invention. FIG. 3 is a partial longitudinal sectional view showing the apparatus of FIG. 2 in an assembled condition, and FIG. 4 is an end view in the direction C.

In FIG. 1 through FIG. 3, the numeral 1 denotes the entirety of an apparatus for producing hydrogen and oxygen according to the present invention. Apparatus 1 for producing hydrogen and oxygen basically comprises a water electrolytic cell 2 which comprises a plurality of annular solid electrolyte membrane units 40 joined together. Each annular solid electrolyte membrane unit 40 comprises a disc-like solid electrolyte membrane 10, annular porous conductors being provided on, and in contact with, each side of solid electrolyte membrane 10, and annular electrode plates 30 being provided outside, and in contact with, each porous conductor 20. Each electrode plate 30, capable of performing both the functions of an anode and a cathode, is a bipolar-type electrode plate which is a single electrode plate having opposing faces of opposite polarity when energized.

To be more specific, the apparatus for producing hydrogen and oxygen comprises a square end plate 60 manufactured from SUS316 stainless steel or the like at one end, a disc-like end insulating plate 70' of a resin such as polytetrafluoroethylene (PTFE) and polyvinyl chloride (PVC), an end electrode plate 30' of titanium, an annular gasket 70 manufactured from a silicone rubber, a fluoro rubber, or a similar gasket material, an annular protective sheet 80 made of tetrafluoroethyleneperfluoroalkylvinylether copolymer (PFA) film or the like, a solid electrolyte membrane 10, a second protective sheet 80, a second annular gasket 70, an intermediate electrode plate 30. This arrangement is repeated a desired number of times, then the apparatus contains an end electrode plate 30', an end insulating plate 70", and an end plate 60'.

In this case, each porous conductor 20 is positioned in a sealed chamber formed by solid electrolyte membrane 10, electrode plate 30, and gasket 70, and a ring-shaped mounting portion 20a formed on the circumference of porous conductor 20 is clamped and fixed by gasket 70 and protective sheet 80 to form an anode chamber (oxygen producing chamber) A and a cathode chamber (hydrogen producing chamber) B, respectively.

Furthermore, in this case, as shown in FIG. 1, each of end electrode plates 30' at both ends is provided, on the outer side thereof, with protruding conductor rods 30a' through 30d' of titanium at four points, and conductor rods 30a' through 30d' penetrate holes for electrodes 70a' through 70d', (70a" through 70d") in the end insulating plates 70' and 70", and penetrate insulating bushings 61a through 61d fit in holes for electrode 60a through 60d, (60'a through 60'd) of the end plates 60 and 60'. Thus, a voltage is applied by a power source being provided separately (not illustrated) to end electrode plates 30' at each end.

Further, solid electrolyte membrane units 40 are provided with a water feeding path 52, a hydrogen gas discharging path 54, an oxygen gas discharging path 56, and a water-draining path 58, each path being of the manifold-type and connecting to the respective solid electrolyte membrane units 40 longitudinally. In the above-mentioned arrangement, no through hole is present that connects the water pressure regulating chamber and the interior of the water electrolytic cell.

In short, water feeding path 52 is a manifold-type path that starts from a nozzle 62 for feeding deionized water that is provided on end plate 60', connects to a hole 72" in end insulating plate 70", a hole 32' for feeding deionized water in one end electrode plate 30', a hole 72 in gasket 70, a hole 82 in Protective sheet 80, a hole 12 for feeding deionized water in solid electrolyte membrane 10, a hole 82 in protective sheet 80, a hole 72 in gasket 70, a hole 32 for feeding deionized water in intermediate electrode plate 30, and so on, and ends at a hole 32' for feeding deionized water in other end electrode plate 30'.

Similarly, hydrogen gas discharging path 54 is a manifold-type path that starts from a nozzle 64 (not shown in FIG. 1) for discharging hydrogen gas that is provided on end plate 60, connects to a hole 74' in end insulating plate 70', a hole 34' for discharging hydrogen gas in one end electrode plate 30', a hole 74 in gasket 70, a hole 84 in protective sheet 80, a hole 14 for discharging hydrogen gas in solid electrolyte membrane 10, a hole 84 in protective sheet 80, a hole 74 in gasket 70, a hole 34 for discharging hydrogen gas in intermediate electrode plate 30, and so on, and ends at a hole 34' for discharging hydrogen gas in the other end electrode plate 30'.

And similarly, oxygen gas discharging path 56 is a manifold-type path that starts from a nozzle 66 for discharging oxygen gas that is provided on end plate 60', connects to a hole 76" in end insulating plate 70", a hole 36' for discharging oxygen gas in one end electrode plate 30', a hole 76 in gasket 70, a hole 86 in protective sheet 80, a hole 16 for discharging oxygen gas in solid electrolyte membrane 10, a hole 86 in the protective sheet 80, a hole 76 in gasket 70, a hole 36 for discharging oxygen gas in intermediate electrode plate 30, and so on, and ends at a hole 36' for discharging oxygen gas in other end electrode plate 30'.

Furthermore, similarly, water-draining path 58 is a manifold-type path that starts from a water-draining nozzle 68 (not shown in FIG. 1) provided on end plate 60, connects to a hole 78' in the end insulating plate 70', a water-draining hole 38' in one end electrode plate 30', a hole 78 in gasket 70, a hole 88 in protective sheet 80, a water-draining hole 18 in the solid electrolyte membrane 10, a hole 88 in the protective sheet 80, a hole 78 in the gasket 70, a water-draining hole 38 in intermediate electrode plate 30, and so on, and ends at a water-draining hole 38' in the other end electrode plate 30'.

In the case of the present embodiment, as shown in FIGS. 2 and 4, nozzle 64 for collecting hydrogen gas and water-draining nozzle 68 are provided on end plate 60, and nozzle 62 for feeding deionized water and nozzle 66 for discharging oxygen gas are provided on end plate 60'. The arrangement of these nozzles, however, can be modified as desired, for example, all nozzles may be arranged on one end plate.

Figure 6:
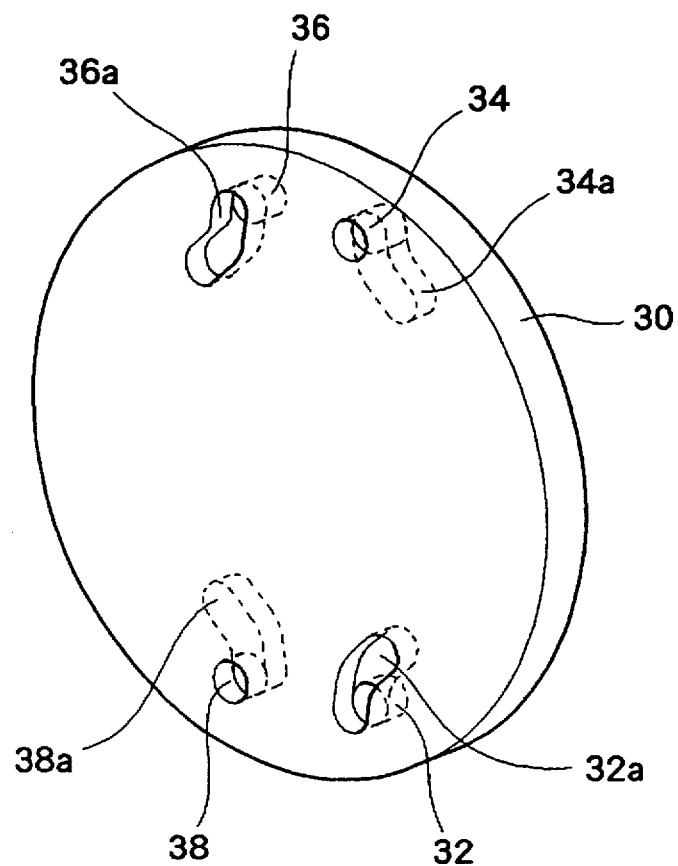
FIG. 6 is an enlarged perspective view of the electrode 30.
Figure 7A:
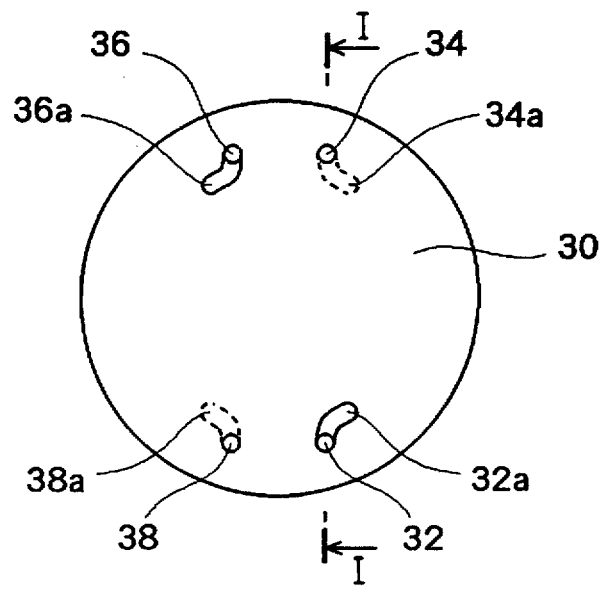
FIG. 7(a) is a front view thereof.
Figure 7B:
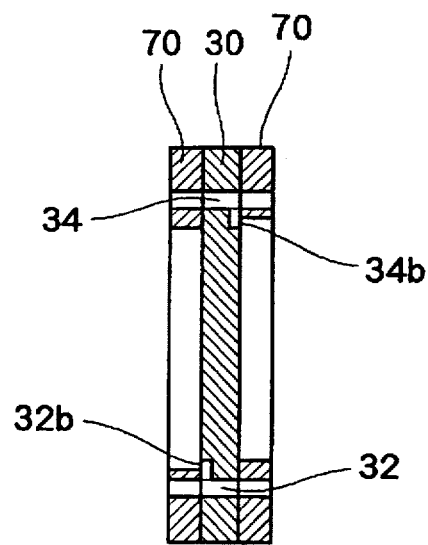
FIG. 7(b) is a sectional view along the line B—B of FIG. 7(a).
Figure 8:
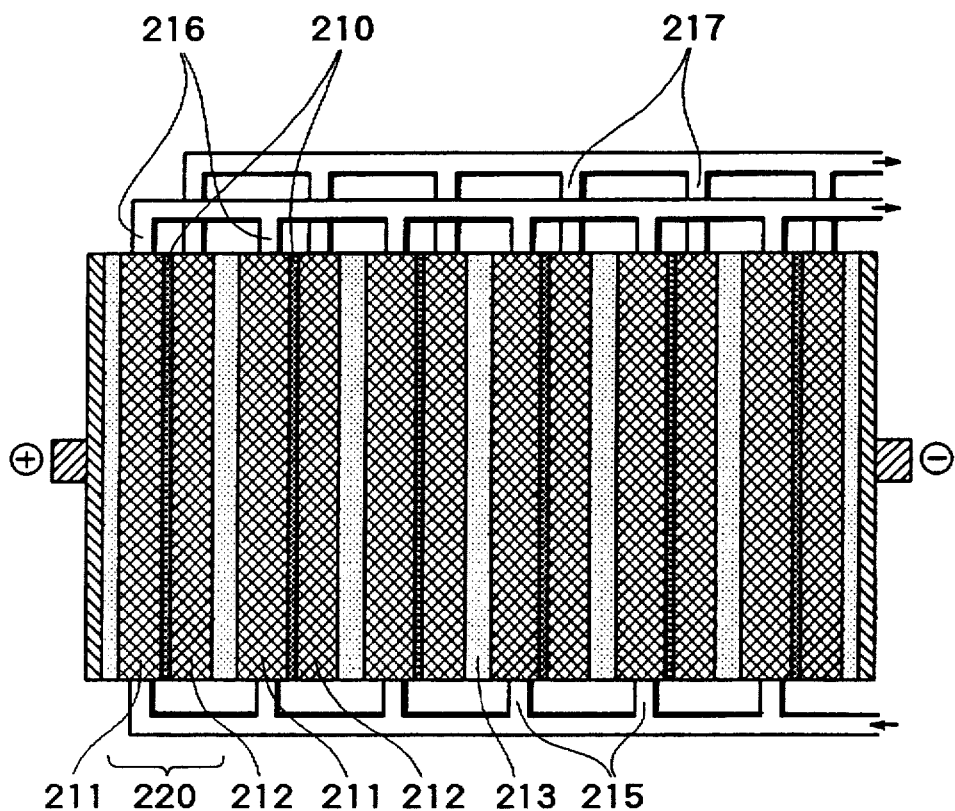
FIG. 8 is a sectional view schematically showing a prior art conventional double electrode filter press-type apparatus for producing hydrogen and oxygen.

FIG. 6 is an enlarged perspective view of electrode plate 30, FIG. 7(a) is a front view thereof, and FIG. 7(b) is a sectional view thereof along the line:B—B of FIG. 7(a).

Now, as shown in these diagrams, the anode side surface of electrode plate 30 is provided with a roughly inverted L-shaped groove-like water feeding dent 32a that extends to a hole for feeding water 32 to feed deionized water from water feeding path 52 to the anode chamber A. On the other hand, the anode side surface of electrode plate 30 is provided, at a position point symmetrical to water feeding path 52 with respect to the central axis, with a roughly inverted L-shaped groove-like oxygen gas collecting dent 36a that extends to a hole 36 for discharging oxygen gas to collect oxygen gas generated in the anode chamber A and deionized water via oxygen gas discharging path 56. The cathode side surface of electrode plate 30 is provided with a roughly inverted L-shaped groove-like hydrogen gas collecting dent 34a that extends to a hole 34 for discharging hydrogen gas to collect hydrogen gas generated in the cathode chamber B via hydrogen gas discharging path 54. Moreover, the cathode side surface of electrode plate 30 is provided, at a position point symmetrical to hydrogen gas discharging path 54 with respect to the central axis, with a roughly inverted L-shaped groove-like water drain collecting dent 38a that extends to a water-draining hole 38 to drain deionized water accumulated in the cathode chamber B via water-draining path 58.

The arrangement of electrode plate 30, however, is not limited to the construction mentioned above. Any construction can be used provided that the construction assures that deionized water can be fed efficiently to anode chamber A, generated oxygen gas can be collected efficiently, and hydrogen gas and water can be discharged efficiently from the cathode chamber.

With respect to solid electrolyte membrane 10, it is suitable to use a solid polymer electrolyte formed into a membrane, for example, a "solid polymer electrolyte membrane," wherein a porous anode and a porous cathode constructed from a precious metal, particularly a metal of the platinum group, are chemically bonded by chemical plating onto opposing surfaces of a cation exchange membrane (e.g., a cation exchange membrane made of fluorocarbon resin containing sulphonic acid groups, for example, NAFION 117 available from E. I. DuPont deNemours). In this case, both electrodes preferably are made of platinum, and in particular, when both electrodes are of a two-layer construction of platinum and iridium, it is possible to electrolyze with a high current density, for example, at 80° C. and 200 A/dm² for about four years. A conventional solid electrolyte wherein electrodes are in physical contact an ion exchange membrane are only able to electrolyze at 50 to 70 A/dm². In this case, in addition to the above-mentioned iridium, it is possible to use a solid polymer electrolyte membrane of a multi-layer construction, wherein two or more metals of the platinum group are plated. Such a membrane is capable of operating at higher current densities.

Solid electrolyte membrane 10 of the present invention has a construction wherein electrodes of a precious metal or metals are chemically bonded by chemical plating onto each of the opposing surfaces of a solid polymer electrolyte. Therefore, no water is present between the solid polymer electrolyte and either electrode. Hence, there is no solution resistance or gas resistance, and in turn, contact resistance between the solid polymer electrolyte and both electrodes is low, the voltage is low, and the current distribution is even. As a result, it is possible to use a higher current density and electrolyze water at higher temperatures and at higher pressures, resulting in the production of high purity oxygen and hydrogen gases with higher efficiency.

On the other hand, with respect to porous conductor 20, it is preferable to use a mesh of titanium, for example, three plies of expanded metal having a total thickness of a few millimeters. Using such porous conductors makes it possible to feed electricity necessary for electrolysis from electrode plates 30 to platinum-plated portions on the surfaces of solid electrolyte membrane 10, while deionized water, i.e., the raw material, and generated oxygen and hydrogen gases are allowed to pass through the porous conductors. In short, porous conductor 20 merely requires a porous material of construction that is conductive and permeable to air. In addition to the above-mentioned mesh material, it is possible to use carbon porous materials, metallic porous materials, porous and conductive ceramics, and similar porous materials.

With respect to electrode plate 30, titanium is used as the material of construction because of its corrosion resistance. In the present embodiment, electrode plates of 5 mm to 6 mm thick are used.

Furthermore, as shown in FIG. 3, disc-like end plates 60 and 60' are made of stainless steel, for example, SUS304 or SUS316, and are positioned outside solid electrolyte units 40 at each end. When arranging the solid electrolyte membrane units 40 in series, a water electrolyte cell comprising the solid electrolyte membrane units 40 is contained in a roughly cylindrical pressure vessel 90, manufactured from a metal such as SUS304 or SUS316. Pressure vessel 90 also can be made of a resin.

Pressure vessel 90 is provided with a feedwater inlet 90a and a feedwater outlet 90b, and a gap is provided between the exterior of the water electrolytic cell and the interior of the pressure vessel 90, the gap forming a water pressure regulating chamber 97. Water pressure regulating chamber 97 (FIG. 3) is provided, in its lower part in the longitudinal direction thereof, with a stand-shaped spacer 98 made of an insulating plastic, such as PTFE (polytetrafluoroethylene), PVDF (polyvinylidenefluoride), or PFA (tetrafluoroethyleneperfluoroalkylvinylether copolymer), to prevent contact between water electrolytic cell 2 and pressure vessel 90.

It is further arranged such that pressure vessel 90 and end plate 60 are fixed together by means of plural bolt holes 93 formed in a flange 90' formed on the pressure vessel on end plate 60 side, and bolts (not illustrated) to be secured in bolt mounting holes 62 made in end plate 60, then bolts 92 are put through holes 94 and 94' (four each in the present embodiment) made in end plates 60 and 60' at each end, and the bolts are tightened by nuts 96, with bolts 92 passing outside pressure vessel 90.

Figure 5:
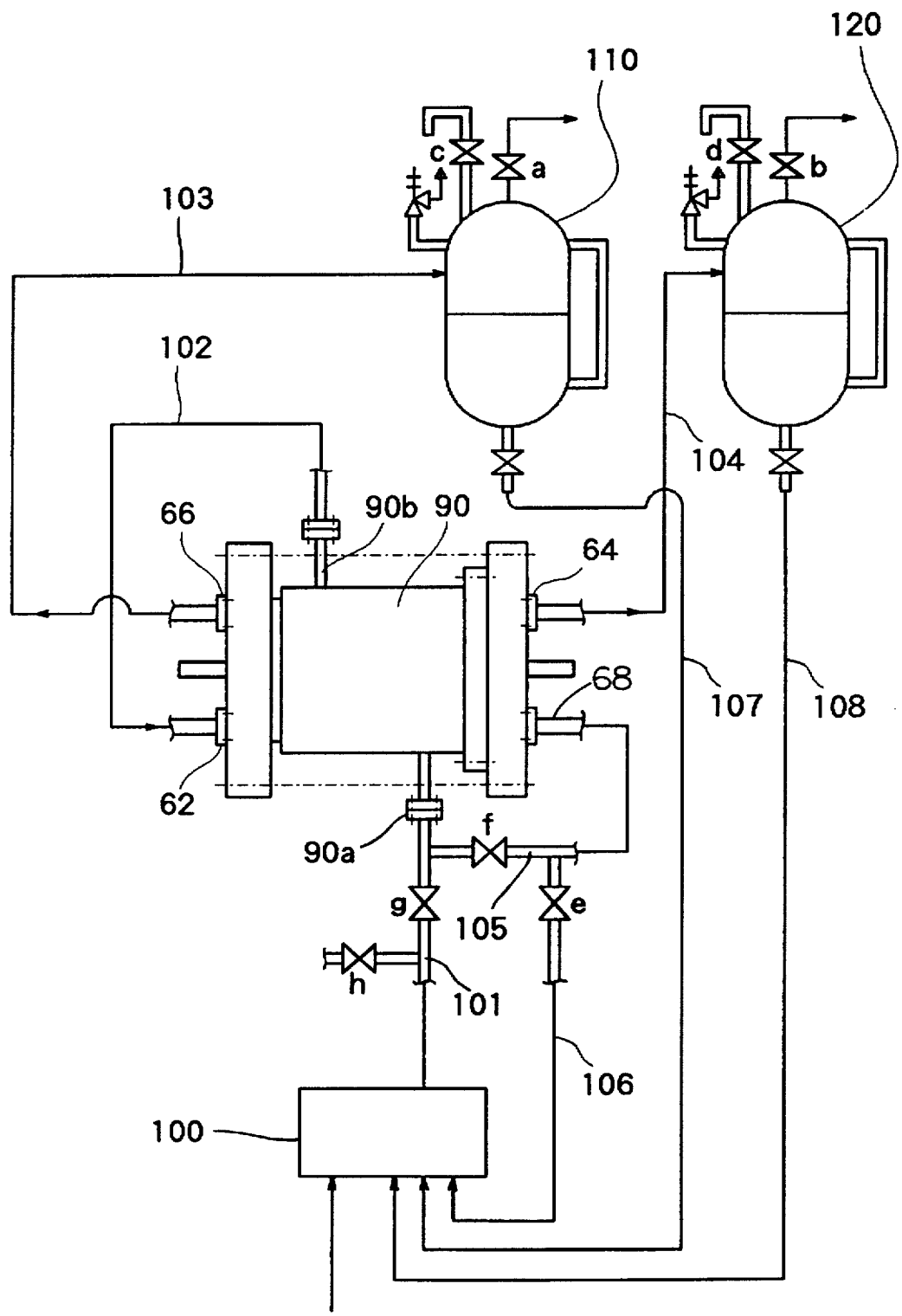
FIG. 5 is a schematic view showing the overall construction of an apparatus for producing hydrogen and oxygen according to the present invention.

In the apparatus for producing hydrogen and oxygen shown in FIG. 5, a deionized water feeding line 101 from a deionized water unit 100 is connected to a feedwater inlet 90a of pressure vessel 90, and a feedwater outlet 90b and nozzle 62 for feeding deionized water are connected by a line 102. Furthermore, nozzle 66 for discharging oxygen gas is connected to an oxygen gas-liquid separator 110 by a line 103, and oxygen gas separated from liquid in oxygen gas-liquid separator 110 is connected to a use point such as a storage tank (not illustrated). On the other hand, similarly, nozzle 64 for discharging hydrogen gas is connected to a hydrogen gas-liquid separator 120 by a line 104, and hydrogen gas separated from liquid in the hydrogen gas-liquid separator 120 is connected to a use point such as a storage tank (not illustrated). Water-draining nozzle 68 is connected to a deionized water feeding line 105 by line 101 and to deionized water unit 100 by a line 106.

Deionized water, which is subjected to gasliquid separation in oxygen gas-liquid separator 110 and hydrogen gas-liquid separator 120, is connected by a line 107 and a line 108, respectively, to deionized water unit 100.

In starting up apparatus 1 for producing hydrogen and oxygen constructed as described above, first, with automatic valves a and b on the use point sides of oxygen gas-liquid separator 110 and hydrogen gas-liquid separator 120 being kept closed, gas vent valves c and d are opened. Next, with a drain valve e on line 106 being kept closed, a valve f on line 105 is opened. After that, a valve g on deionized water feeding line 101 is opened gradually to feed deionized water, at a pressure of about 9 kg/cm², via feedwater inlet 90a of pressure vessel 90, into water pressure regulating chamber 97 (FIG. 3). In this case, the pressure of the feedwater is 9.0 to 9.9 kg/cm². However, because the set pressure of a pressure relief valve h on line 101 is set at about 9 kg/cm², the feedwater to water pressure regulating chamber 97 is maintained at about 9 kg/cm². The pressure differential of the water electrolytic cell, therefore, can be maintained at about 0.1 kg/cm² or less.

Then, deionized water from feedwater outlet 90b of pressure vessel 90 is fed, via line 102, nozzle 62 for feeding deionized water, water feeding path 52, hole 32 for feeding deionized water of the electrode plate 30, and deionized water feeding port 32b of the groove-shaped deionized water feeding dent 32a formed on the anode side surface of the electrode plate 30, to porous conductor 20 stored in the anode chamber A. After that, deionized water is collected via groove-shaped oxygen gas collecting dent 36a formed on the anode side surface of electrode plate 30 at the position point symmetrical to deionized water feeding path 52 with respect to the central axis, and then deionized water is discharged via hole 36 for discharging oxygen gas of electrode plate 30, oxygen gas discharging path 56, nozzle 66 for discharging oxygen gas being provided on end plate 60', line 103, and finally out of gas vent valve c of oxygen gas-liquid separator 110.

On the other hand, from deionizer 100, deionized water is fed, via lines 101 and 105, to water-draining nozzle 68, then deionized water is fed, via water-draining path 58 of electrode plate 30, and groove-shaped water drain collecting dent 38a formed on the cathode side surface of electrode plate 30 in the position point symmetrical to hydrogen gas discharging path 54 with respect to the central axis, into cathode chamber B.

After that, deionized water fed into the cathode chamber is collected via groove-shaped hydrogen gas collecting dent 34a formed on the cathode side surface of electrode plate 30 and is discharged, via hole 34 for discharging hydrogen gas of electrode plate 30, hydrogen gas discharging path 54, nozzle 64 for discharging hydrogen gas of end plate 60', line 104, and finally out of gas vent valve d of hydrogen gas-liquid separator 120.

When deionized water is discharged from gas vent valves c and d of both gas-liquid separators 110 and 120, gas vent valves c and d are closed. At the time, the water pressure in the water electrolytic cell is substantially equivalent to the water pressure in the water pressure regulating chamber, or about 9 kg/cm$^2$. In this way, both the water pressure of the anode chamber and of cathode chamber are maintained at about 9 kg/cm$^2$ at the startup of the apparatus, so that the solid electrolyte membrane is not damaged. After that, valve f of line 105 is closed to feed deionized water to the oxygen side only, and electrolysis is started. In this case, after gas vent valves c and d are closed, when valve f of line 105 is closed, the water pressure in the apparatus is maintained at a pressure of about 9 kg/cm$^2$, and in turn, the pressure in the water electrolytic cell is kept at about 9 kg/cm$^2$. Hence, at the time of startup and during the operation, the pressure differential between the water electrolytic cell and the water pressure regulating chamber is maintained within the pressure tolerance range of the sealing elements of the water electrolytic cell.

After electrolysis is started as described above, automatic valves a and b provided for both gasliquid separators 110 and 120 are controlled such that the pressure differential between oxygen gas and the hydrogen gas is maintained at no higher than 4 kg/cm$^2$, being the maximum design pressure differential between the oxygen side and the hydrogen side of solid electrolyte membrane 10.

During electrolysis, deionized water is fed to porous conductor 20 stored in the anode chamber A via nozzle 62 for feeding deionized water, deionized water feeding path 52, hole 32 for feeding deionized water of electrode plate 30, and deionizing water feeding port 32b of groove-shaped deionized water feeding dent 32a formed on the anode side surface of electrode plate 30. Then, deionized water fed into the anode chamber A is electrolyzed. A reaction $2H_2O \rightarrow O_2 + 4H^+ + 4e^-$ occurs to generate oxygen gas. The oxygen gas and deionized water are collected via oxygen gas collecting dent 36a formed on the anode side surface of electrode plate 30. And the oxygen gas and deionized water are removed via hole 36 for discharging oxygen gas of electrode plate 30, oxygen gas discharging path 56, and finally out of nozzle 66 for discharging oxygen gas. The oxygen gas is separated from water in oxygen gas-liquid separator 110 connected to oxygen gas discharging path 56.

On the other hand, on the cathode side, H$^+$ passes through solid electrolyte membrane 10. A reaction $4H^+ + 4e^- \rightarrow 2H_2$ occurs to generate hydrogen gas, and hydrogen gas and water are collected via groove-shaped hydrogen gas collecting dent 34a formed on the cathode side surface of electrode plate 30, and water and hydrogen gas are removed via hole 34 for discharging hydrogen gas of electrode plate 30 and hydrogen gas discharging path 54, of nozzle 64 for discharging hydrogen gas. Hydrogen gas is separated from water in hydrogen gas-liquid separator 120 connected to hydrogen gas discharging path 54.

Furthermore, deionized water accumulating in cathode chamber B via groove-shaped water drain collecting dent 38a formed on the cathode side surface of electrode plate 30 is removed from water-draining nozzle 68 via water-draining path 58 of electrode plate 30.

Figure 9:
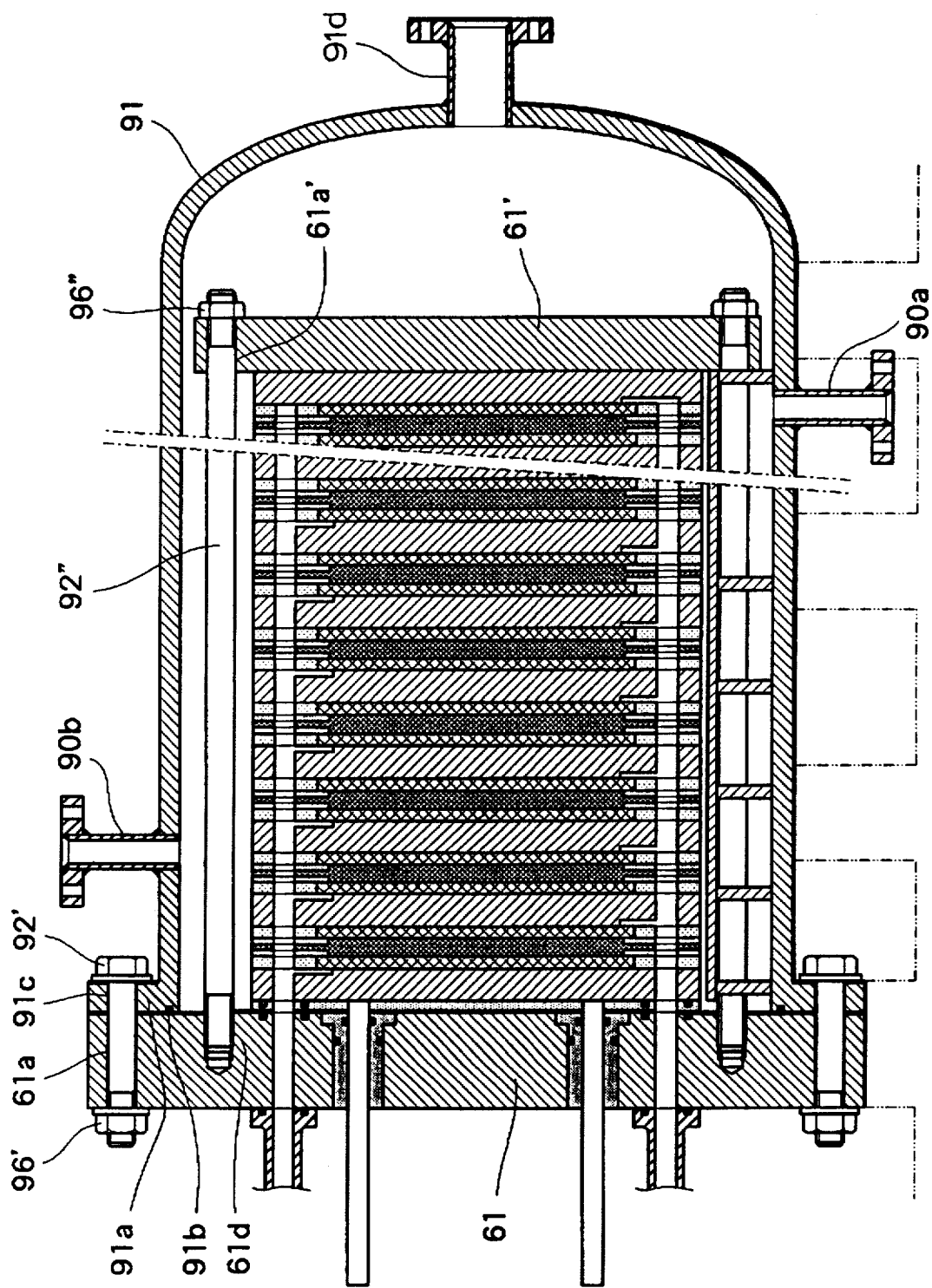
FIG. 9 is a partial longitudinal sectional view of another embodiment of an apparatus for producing hydrogen and oxygen according to the present invention in an assembled state.

FIG. 9 is a partial longitudinal sectional view showing another embodiment of an apparatus for producing hydrogen and oxygen of the present invention, in the assembled state thereof.

The construction of the electrolytic cell is similar to the construction of the electrolytic cell of the first embodiment shown in FIG. 1 and FIG. 2. In the present embodiment, the water electrolytic cell is stored in a dome-shaped pressure vessel 91, and an end plate 61 at one end of the electrolytic cell serves as the cover of pressure vessel 91. A sealing member 91b is provided on a flange 91a of pressure vessel 91, and pressure vessel 91 and end plate 61 are clamped together by means of mounting holes 91c provided in flange 91a, mounting holes 61a provided in end plate 61, and through bolts 92' and nuts 96'. Pressure vessel 91 is provided, identically to the first embodiment, with a feedwater inlet and a feedwater outlet. In addition to the inlet and outlet, an inspection hole 91d also is provided. Normally, installation of the pressure vessel is "horizontal," wherein the longitudinal direction of the vessel is set horizontal. When the installation is "vertical," inspection hole 91d serves as a feedwater outlet, 90b serves as a feedwater inlet, and 90a as an inspection hole, respectively.

With regard to the assembly of the water electrolytic cell, end plate 61, positioned to be outside pressure vessel 91, is provided with threaded holes 61d for assembling the water electrolytic cell, and bolts 92" are inserted through mounting holes 61a ' being provided in an end plate 61' on the other end and clamped with nuts 96".

As explained above, in the first embodiment, bolts of one kind are used for both clamping the water electrolytic cell and clamping the pressure vessel, whereas in the present embodiment, bolts for clamping the water electrolytic cell and bolts for clamping the pressure vessel are provided separately. This increases the freedom of selecting and designing the bolt, and also halves the possibility of water or other leakages, because the number of sealed surfaces is reduced to one.

What is claimed is:

1. An apparatus for producing hydrogen and oxygen comprising:

a bipolar water electrolytic cell positioned in a pressure vessel, said bipolar water electrolytic cell comprising a plurality of joined solid electrolyte membrane units, wherein each solid electrolyte membrane unit comprises a solid electrolyte membrane having two opposing surfaces, a porous conductor in contact with each opposing surface of the solid electrolyte membrane, and a bipolar electrode plate in contact with each porous conductor, wherein each electrode plate is capable of performing as an anode and a cathode, and wherein a gap between the interior of the pressure vessel and the exterior of the water electrolytic cell forms a water pressure regulating chamber, said regulating chamber adapted to receive water of a preselected pressure, such that the pressure differential between the pressure inside the water electrolytic cell and the pressure inside the water pressure regulating chamber is maintained within the pressure differential tolerance range of the water electrolytic cell.

2. The apparatus of claim 1 wherein the water electrolytic cell further comprises at least one manifold water feeding path, and at least one manifold water-draining path connected to the respective solid electrolyte membrane units longitudinally, such that by uniformly feeding pressurized water into both sides of the solid electrolyte membrane at the time of starting the apparatus, the pressure on each side of the solid electrolyte membrane is substantially identical.

3. The apparatus of claim 1 further comprising an oxygen gas-liquid separator and a hydrogen gas-liquid separator, wherein each separator has a pressure regulator, said regulators arranged to maintain the pressure differential between generated oxygen gas and generated hydrogen gas within the maximum design tolerance range of the solid electrolyte membrane.

4. The apparatus of claim 1 further comprising a manifold hydrogen gas discharging path for discharging hydrogen gas and a manifold oxygen gas discharging path for discharging oxygen gas from the solid electrolyte membrane unit, said discharging paths connected to the solid electrolyte membrane unit longitudinally.

5. The apparatus of claim 1 further comprising at least one spacer in the water pressure regulating chamber to prevent contact between the interior of the pressure vessel and the exterior of the electrolytic cell.

6. The apparatus of claim 1 wherein the solid electrolyte membrane is a solid polymer electrolyte membrane.

* * * * *

UNITED STATES PATENT AND TRADEMARK OFFICE
CERTIFICATE OF CORRECTION

PATENT NO. : 5,783,051
DATED : July 21, 1998
INVENTOR(S) : Kiyoshi Hirai et al.

It is certified that error appears in the above-identified patent and that said Letters Patent is hereby corrected as shown below:

Column 1, line 6, "bipolartype" should be -- bipolar-type --

Column 1, line 15, "socalled" should be -- so-called --

Column 4, lines 54, 55, insert "20" between "conductors" and "being"

Column 5, line 44, "Protective" should be --protective--

Column 8, line 27, "gasliquid" should be -- gas-liquid --

Column 9, line 37, "gasliquid" should be -- gas-liquid --

Column 10, line 45, "bolt," should be --bolts,--

Signed and Sealed this

Twenty-fourth Day of August, 1999

Attest:

Q. TODD DICKINSON

*Attesting Officer*    Acting Commissioner of Patents and Trademarks